(12) United States Patent
Koreeda et al.

(10) Patent No.: US 8,297,855 B2
(45) Date of Patent: Oct. 30, 2012

(54) OPTICAL CONNECTOR

(75) Inventors: Yuichi Koreeda, Tokyo (JP); Hikaru Kouta, Tokyo (JP); Kaichiro Nakano, Tokyo (JP); Hisaya Takahashi, Tokyo (JP); Takashi Ohtsuka, Tokyo (JP); Hideyuki Ono, Tokyo (JP)

(73) Assignees: Japan Aviation Electronics Industry, Limited, Tokyo (JP); NEC Corporation, Tokyo (JP)

( * ) Notice: Subject to any disclaimer, the term of this patent is extended or adjusted under 35 U.S.C. 154(b) by 448 days.

(21) Appl. No.: 12/449,175

(22) PCT Filed: Jan. 25, 2008

(86) PCT No.: PCT/JP2008/051092
§ 371 (c)(1),
(2), (4) Date: Oct. 15, 2009

(87) PCT Pub. No.: WO2008/090981
PCT Pub. Date: Jul. 31, 2008

(65) Prior Publication Data
US 2010/0054673 A1    Mar. 4, 2010

(30) Foreign Application Priority Data
Jan. 26, 2007  (JP) ................................ 2007-016249

(51) Int. Cl.
*G02B 6/36*  (2006.01)

(52) U.S. Cl. ......................................................... 385/92
(58) Field of Classification Search ............... 385/88–92
See application file for complete search history.

(56) References Cited

U.S. PATENT DOCUMENTS
7,144,256 B2 * 12/2006 Pabst et al. ...................... 439/67
7,411,282 B2    8/2008 Furuyama et al.

FOREIGN PATENT DOCUMENTS
| JP | 5-164947 | 6/1993 |
| JP | 08-122563 | 5/1996 |
| JP | 2000-075172 | 3/2000 |
| JP | 2005-286225 | 10/2005 |

OTHER PUBLICATIONS

International Search Report.

* cited by examiner

*Primary Examiner* — Sarah Hahm
(74) *Attorney, Agent, or Firm* — Collard & Roe, P.C.

(57) ABSTRACT

An optical connector 1 is for connecting a connection object 10 to an optical module 21. A slider 3 is slidably held by a housing 2 adapted for positioning the connection object and the optical module. The housing has a first positioning portion for receiving the connection object. The slider has a first pressing portion 3a for elastically pressing the connection object in a first direction toward the first positioning portion and a second pressing portion 3e that elastically acts in a second direction perpendicular to the first direction.

12 Claims, 7 Drawing Sheets

OPTICAL CONNECTOR

CROSS REFERENCE TO RELATED APPLICATIONS

This application is the National Stage of PCT/JP2008/051092 filed on Jan. 25, 2008, which claims priority under 35 U.S.C. §119 of Japanese Application No. 2007-016249 filed on Jan. 26, 2007. The international application under PCT article 21(2) was not published in English.

TECHNICAL FIELD

This invention relates to an optical connector for optically connecting a connection object to an optical module.

BACKGROUND ART

Patent Document 1 describes one example of an LSI package to which a plurality of ribbon fibers are connected. The LSI package includes a board, an LSI chip disposed on the board, and a plurality of receptacles arranged around the LSI chip and mounted on the board. Headers are connected to the ribbon fibers, respectively. Each header has an optical element chip facing an end face of the ribbon fiber and is inserted into a gap formed between the board and the receptacle, thereby electrically connecting the optical element chip to the board.

Patent Document 2 describes one example of an optical coupling device for optically connecting an optical fiber to an LD. The optical coupling device includes a board and a lens formed integrally with the board. The LD is produced separately from the board and is positioned on one side of the lens using a slit formed on the board. On the other hand, an end face of the optical fiber is positioned on the other side of the lens using another slit formed on the board.

Patent Document 1: JP-A-2225-286225
Patent Document 2: JP-A-H5-164947

DISCLOSURE OF THE INVENTION

In the LSI package described above, since each receptacle is configured to electrically connect to the board the optical element chip that is caused to face the end face of the ribbon fiber using the header, optical connection cannot be obtained and diversion to optical connection is also impossible. Further, particularly, when each header is inserted or removed with respect to the receptacle, the optical element chip is exposed to the outside and thus there is a possibility of being damaged.

On the other hand, in the optical coupling device described above, high accuracy is required for alignment among the LD, the lens, and the end face of the optical fiber. However, the positions of the LD and the end face of the optical fiber depend on the slits formed on the board and therefore it is difficult to improve the accuracy of the above-mentioned alignment.

It is therefore an exemplary object of the invention to provide an optical connector that solves the above-mentioned problems.

An optical connector according to an exemplary aspect of the invention is for connecting a connection object to an optical module and comprises a housing for positioning the connection object and the optical module and a slider slidably held by the housing, wherein the housing comprises a first positioning portion for receiving the connection object, and wherein the slider comprises a first pressing portion for elastically pressing the connection object in a first direction toward the first positioning portion and a second pressing portion that elastically acts in a second direction perpendicular to the first direction.

The optical connector according to the exemplary aspect of the invention can easily improve the accuracy of alignment between the connection object and the optical module and thus can obtain preferable optical connection between them.

DESCRIPTION OF EXEMPLARY EMBODIMENTS OF THE INVENTION

Figure 1:
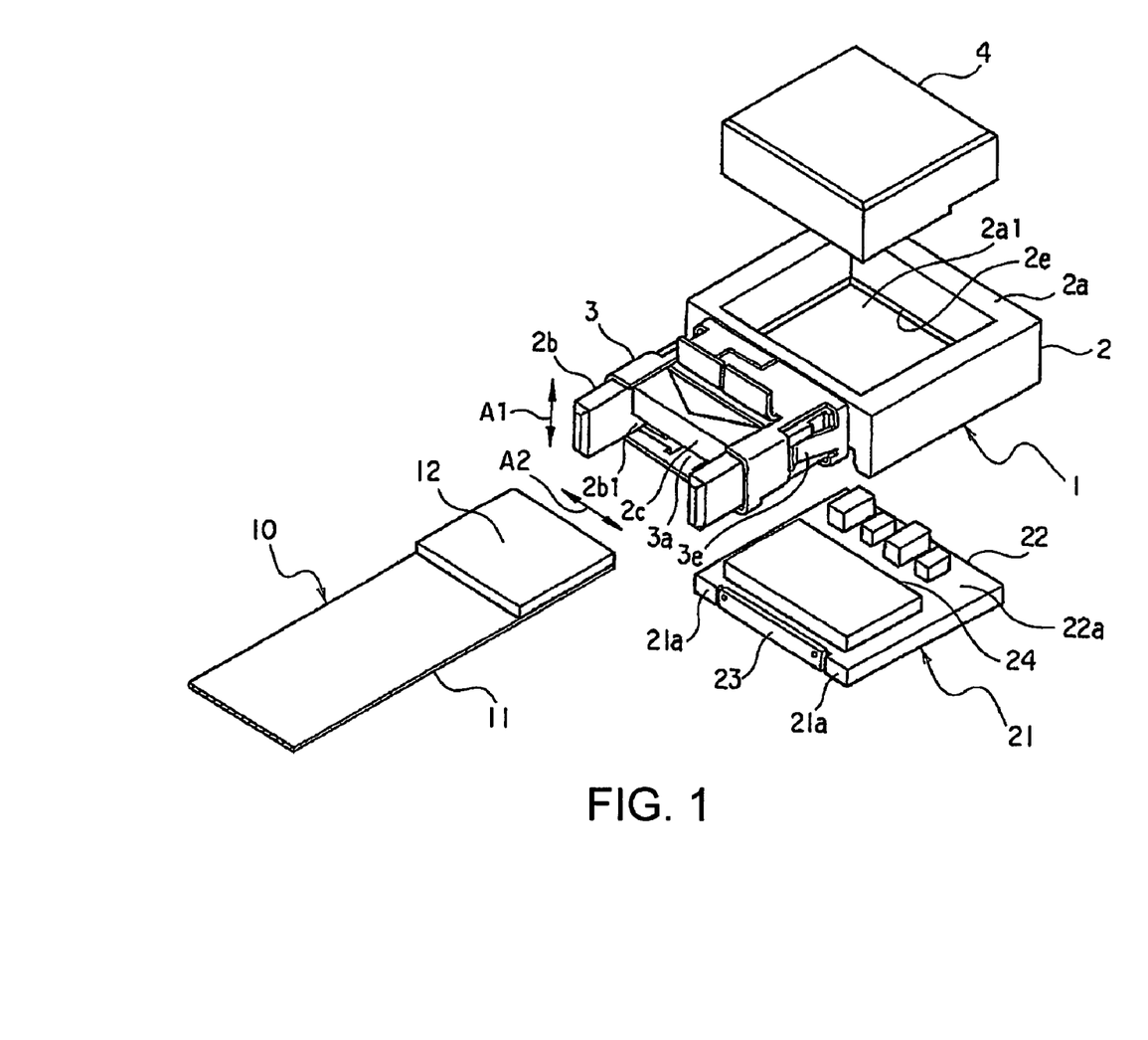
FIG. 1 is an exploded perspective view showing an optical connector according to a first exemplary embodiment of the invention, along with a connection object and an optical module.
Figure 2A:
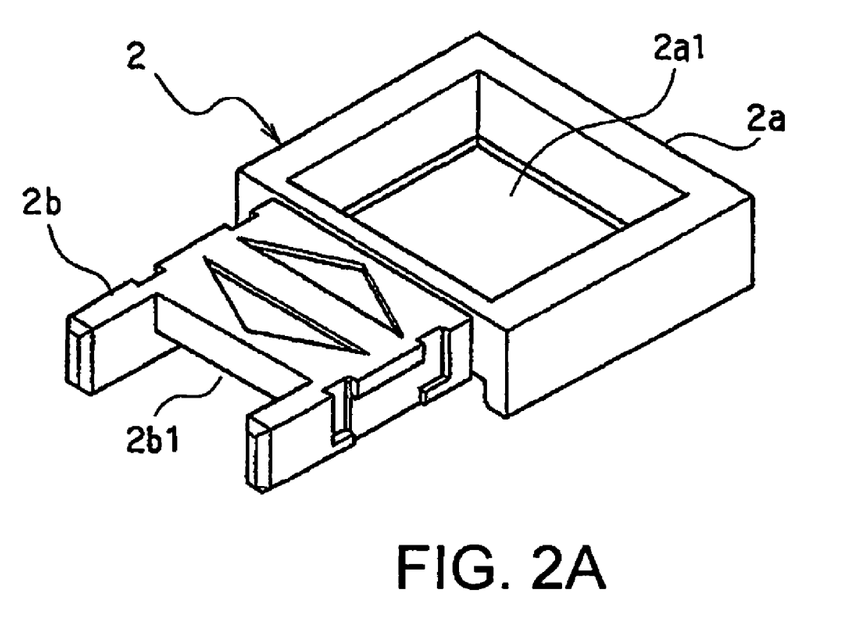
FIG. 2A is a perspective view, as seen from the front surface side, of a housing included in the optical connector of FIG. 1.
Figure 2B:
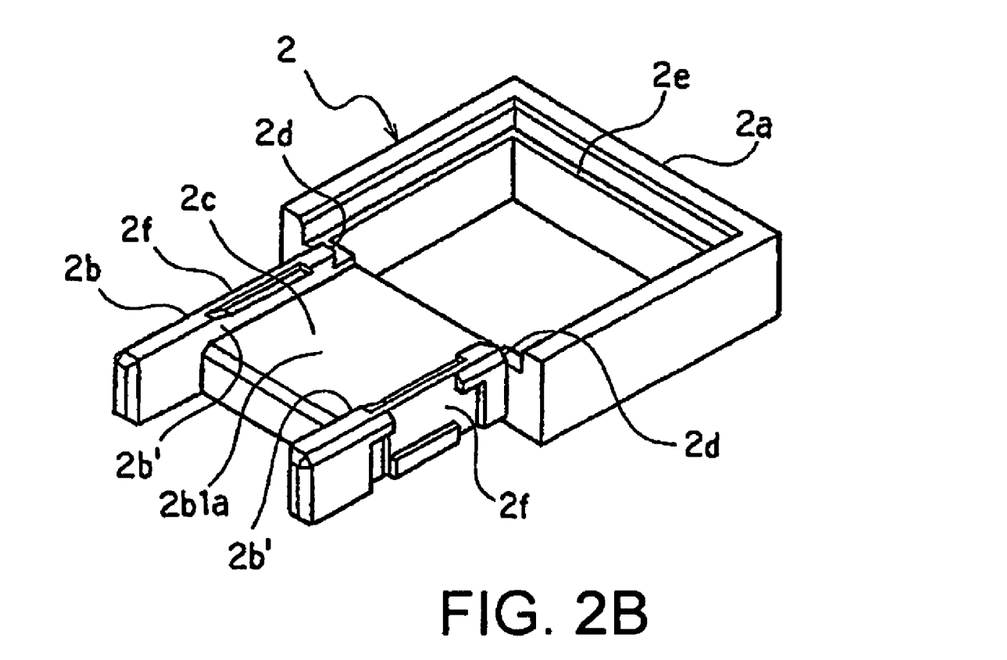
FIG. 2B is a perspective view of the housing of FIG. 2A as seen from the back surface side.
Figure 3:
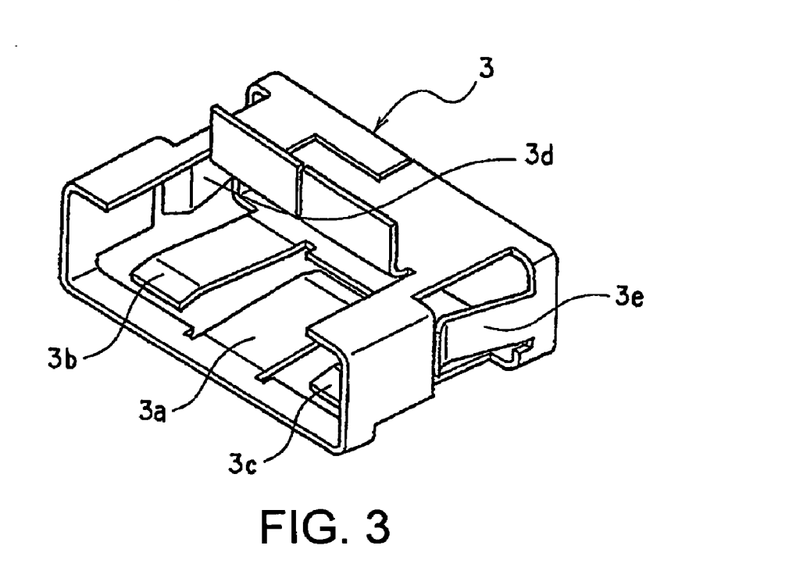
FIG. 3 is an enlarged perspective view of a slider included in the optical connector of FIG. 1.

Referring to FIGS. 1 to 3, an optical connector according to a first exemplary embodiment of the invention will be described.

In FIG. 1, the optical connector is generally designated by reference symbol 1 and can be used for optically connecting a connection object 10 to an optical module 21. The optical module 21 used herein includes a board 22, an optical element 23 mounted on a front face portion of the board 22, and an element driving member 24 mounted on an upper surface of the board 22.

The connection object 10 includes an optical medium 11 which is thin and long, such as a ribbon fiber. For flexibly wiring the optical medium 11 in an electronic device, the less thickness of the optical medium 11 is more favorable. Further, generally, the optical medium 11 costs less as its thickness decreases. However, since there is a possibility of impairing the handleability of the optical medium 11 if it is too thin, a rectangular plate-like base member 12 is fixed to the optical medium 11 at its front end portion in an overlapping manner, thereby reinforcing the optical medium 11.

The optical connector 1 includes a housing 2 made of a resin, a slider 3 slidably held by the housing 2, and a heat radiating plate 4 which is mounted from the upper side of the housing 2.

As shown in FIGS. 2A and 2B, the housing 2 includes a generally rectangular frame-like portion 2a and an integrally formed medium coupling portion or guide portion 2b extending outward from a part of the frame-like portion 2a. The frame-like portion 2a defines a first receiving portion 2a1 at its center. The rectangular parallelepiped heat radiating plate 4 is inserted into the first receiving portion 2a1 from the upper side. End portions 21a of the optical module 21 are butted against end portions 2d, on the lower surface side, of the first receiving portion 2a1. In this event, a mounting surface 22a of the board 22 is mounted on a mounting portion 2e formed inside the frame-like portion 2a. In this manner, the optical module 21 is fitted into the first receiving portion 2a1. If inner dimensions of the first receiving portion 2a1 of the frame-like portion 2a are set slightly greater than outer dimensions of the board 22, the optical module 21 can be easily fitted into the frame-like portion 2a.

The slider 3 is slidably fitted and held around the guide portion 2b. A second receiving portion 2b1 is provided on the front side of the guide portion 2b and, from the midway, further to the rear side of the guide portion 2b on its back surface side. The second receiving portion 2b1 is a portion for inserting the connection object 10 and communicates with the first receiving portion 2a1. The connection object 10 is positioned by a pair of side surfaces 2b', facing each other, of the guide portion 2b and a flat surface 2c formed from the midway to the rear side on the back surface side of the guide portion 2b. That is, a first positioning portion 2b1a is formed by the pair of side surfaces 2b' and the flat surface 2c.

As shown in FIG. 3, the slider 3 is processed into a tubular shape from a single metal plate by punching and bending with a press. The slider 3 is formed with an elastically deformable cantilever-like spring piece 3a extending rearward from the middle of a lower portion on the front side thereof and a pair of elastically deformable cantilever-like spring pieces 3b and 3c extend forward from both sides of a lower portion on the rear side thereof. The spring piece 3a is disposed between the spring pieces 3b and 3c. There are further formed elastically deformable cantilever-like spring pieces 3d and 3e extending forward from both left and right sides on the rear side of the slider 3. Herein, the spring pieces 3a, 3b, and 3c are collectively called "first pressing portions" and the spring pieces 3d and 3e are called "second pressing portions".

The slider 3 is held by the guide portion 2b of the housing 2 so as to be slidable within a predetermined range. The first pressing portions (3a, 3b, 3c) are portions for pressing the optical medium 11 and the base member 12 toward the flat surface 2c in a first direction A1. The second pressing portions (3d, 3e) elastically act in a second direction A2 perpendicular to the first direction A1 and, herein, serve to sandwich therebetween abutting surfaces 2f of the guide portion 2b in the second direction A2.

Next, referring also to FIGS. 4A and 4B, a description will be given of an operation of optically connecting the connection object 10 to the optical module 21 using the optical connector 1.

Figure 4A:
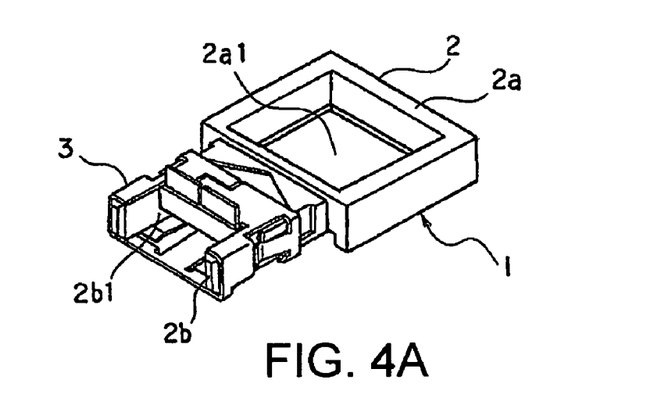
FIG. 4A is a perspective view showing the main part of the optical connector of FIG. 1 in a state before setting the connection object and the optical module.

First, as shown in FIG. 4A, the slider 3 is caused to slide in a direction away from the frame-like portion 2a along the guide portion 2b. Then, the spring pieces 3a, 3b, and 3c are mostly offset from the first positioning portion 2b1a so that insertion of the connection object 10 into the second receiving portion 2b1 is facilitated.

Figure 4B:
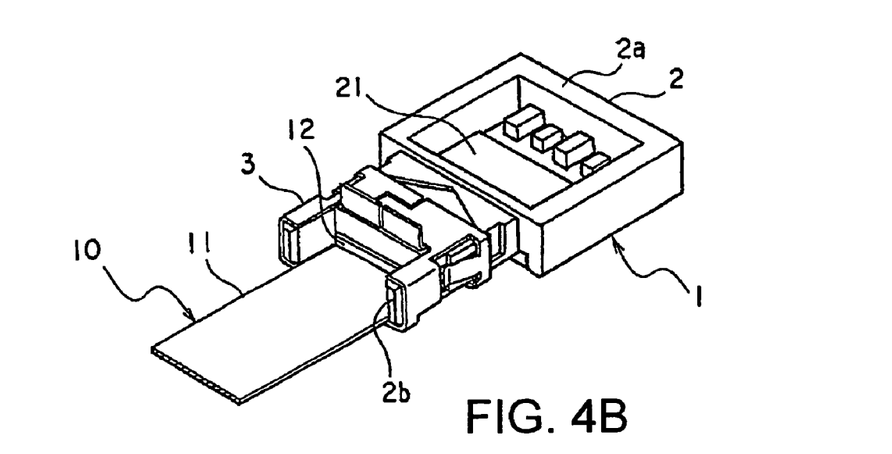
FIG. 4B is a perspective view showing the main part of the optical connector of FIG. 1 in a state after setting the connection object and the optical module.

In this state, as shown in FIG. 4B, the optical module 21 is fitted into the frame-like portion 2a. In this event, the optical element 23 of the optical module 21 is caused to face the second receiving portion 2b1 of the guide portion 2b. Then, the connection object 10 is inserted into the second receiving portion 2b1 so as to butt against the optical element 23 of the optical module 21.

Thereafter, the slider 3 is caused to slide in a direction approaching the frame-like portion 2a along the guide portion 2b. Then, following sliding of the slider 3, the spring pieces 3a, 3b, and 3c press the connection object 10 toward the flat surface 2c. In this manner, the connection object 10 is positioned at a predetermined position in the positioning portion 2b1a. Thus, a front end face of the optical medium 11 is accurately aligned with an end face of the optical element 23 of the optical module 21. As a result, the optical medium 11 is optically connected to the optical module 21 securely.

As will be described next, the connection object 10 can be subjected to various modifications.

Figure 5:
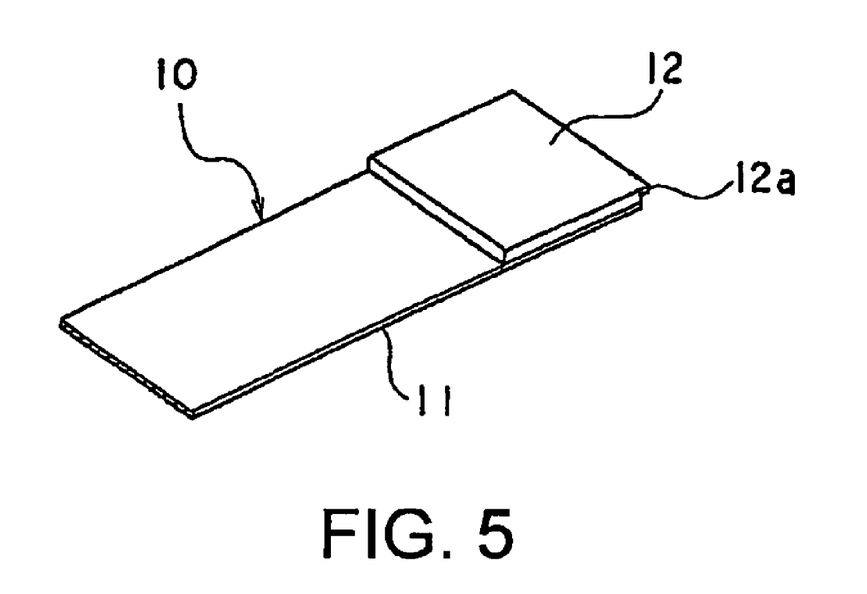
FIG. 5 is a perspective view showing a modification of the connection object.

For example, as shown in FIG. 5, a projection 12a may be formed at a front end portion of the base member 12. In this case, corresponding to the projection 12a, a recess serving as a second positioning portion is formed at least one of an end portion of the optical element 23 and an appropriate portion of the housing 2. With this structure, it is possible to easily carry out positioning of the optical medium 11 with respect to the optical module 21 or the housing 2.

Figure 6:
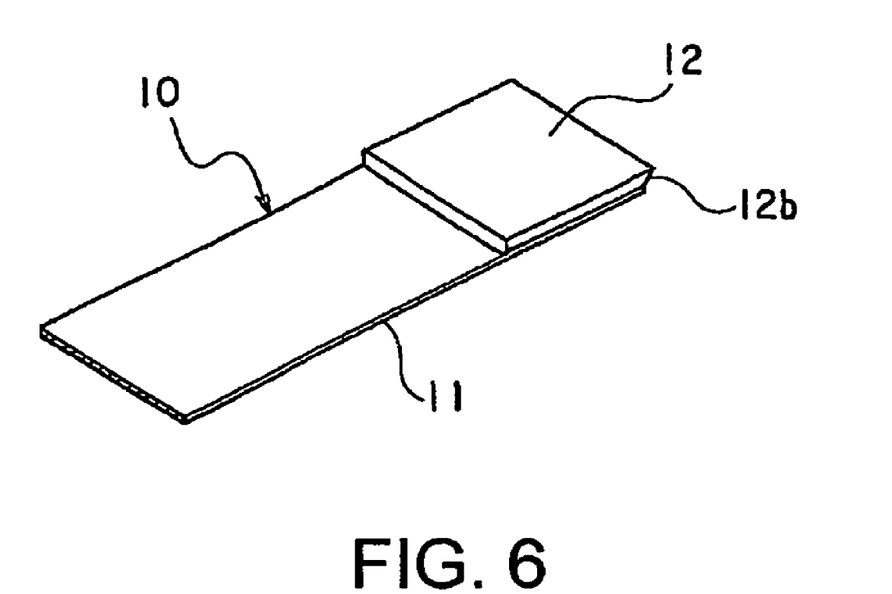
FIG. 6 is a perspective view showing another modification of the connection object.

On the other hand, as shown in FIG. 6, an inclined surface 12b may be formed at a front end portion of the base member 12. In this case, corresponding to the inclined surface 12b, an inclined surface serving as a second positioning portion is formed at least one of an end portion of the optical element 23 and an appropriate portion of the housing 2. With this structure, it is also possible to easily carry out positioning of the optical medium 11 with respect to the optical module 21 or the housing 2.

It is also possible to use the optical medium 11 as a connection object without providing the base member 12.

Figure 7:
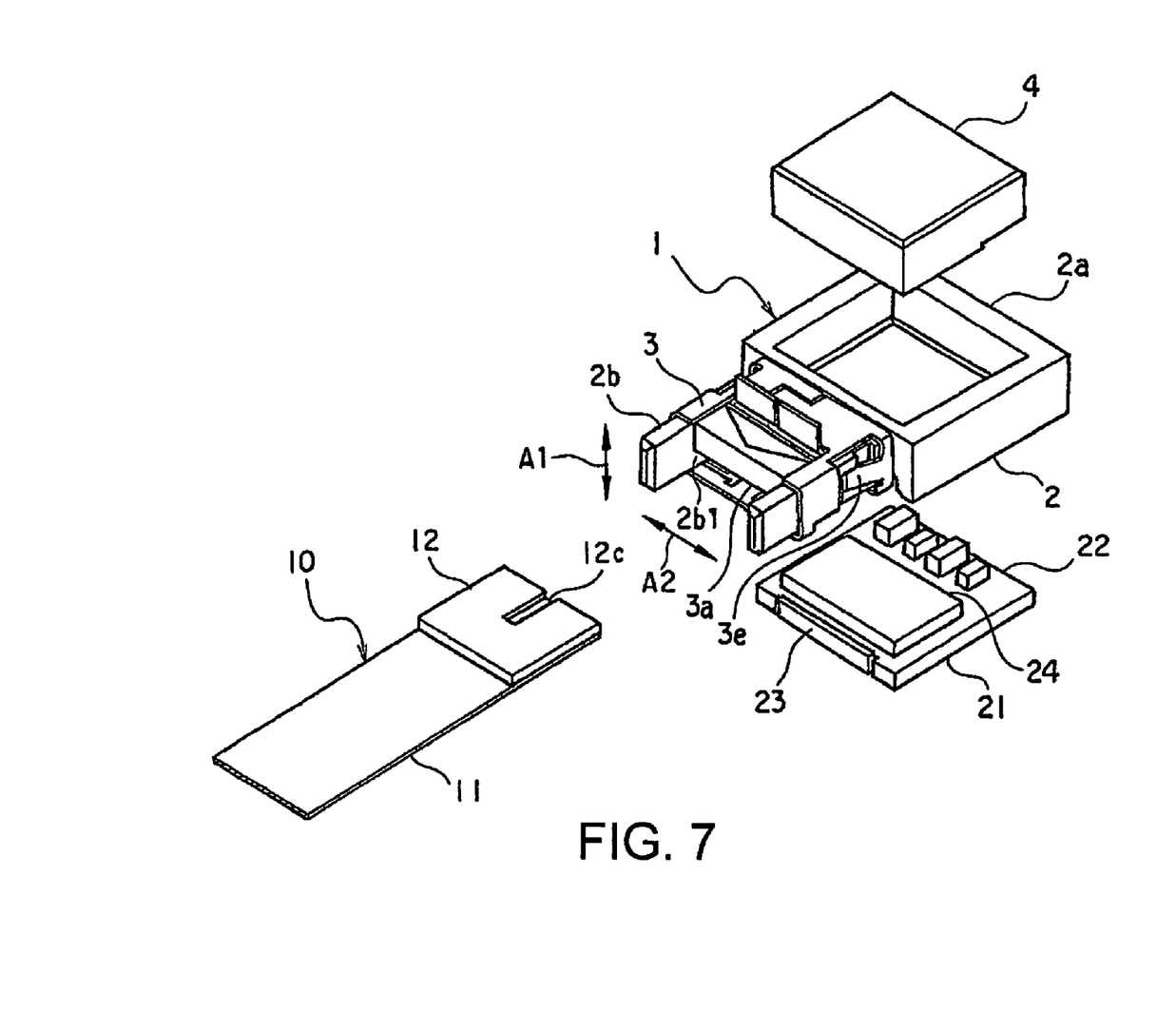
FIG. 7 is an exploded perspective view showing an optical connector according to a second exemplary embodiment of the invention, along with a connection object and an optical module.
Figure 8:
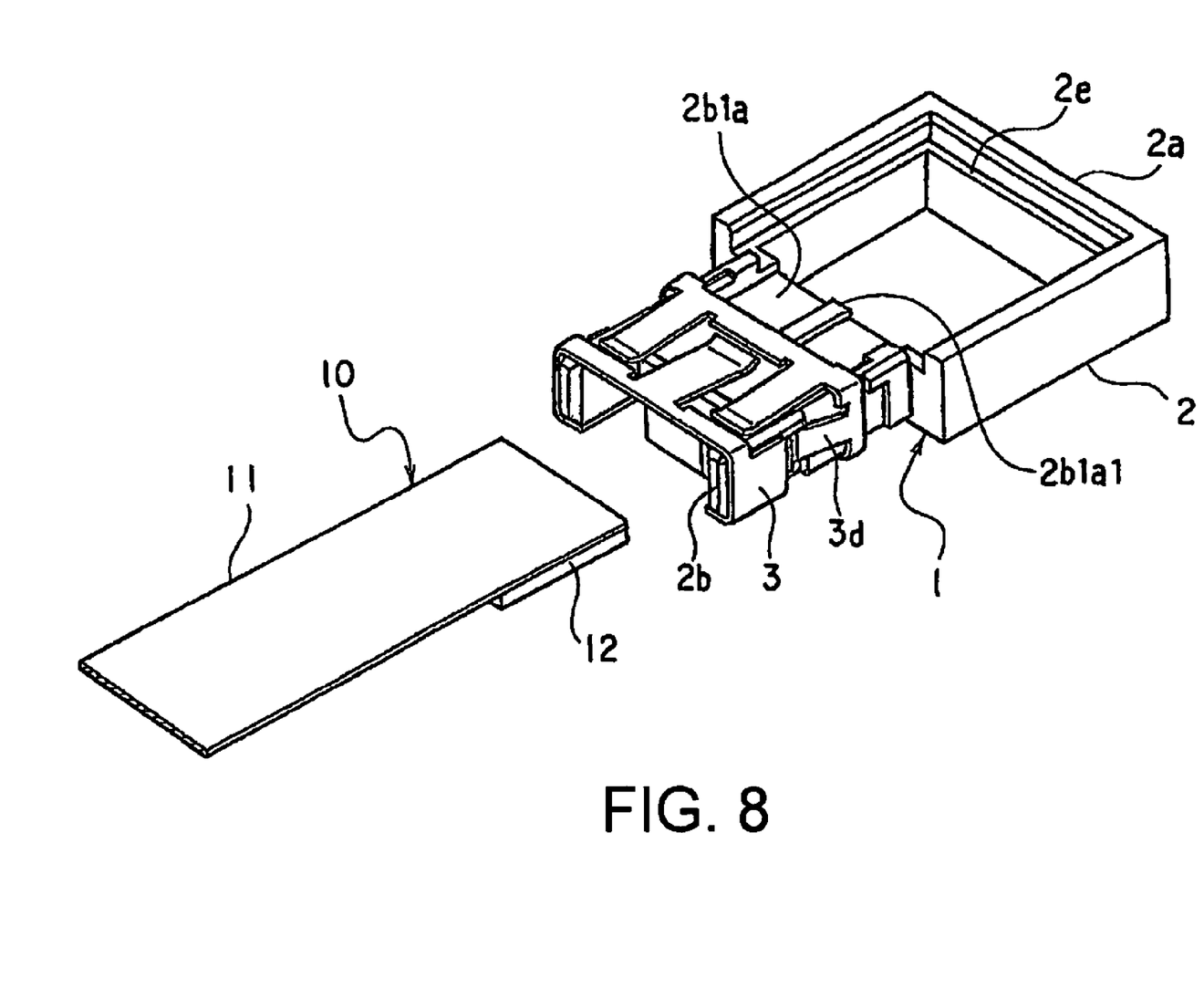
FIG. 8 is a perspective view, as seen from the back surface side, showing the main part of the optical connector shown in FIG. 7, along with the connection object.
Figure 9:
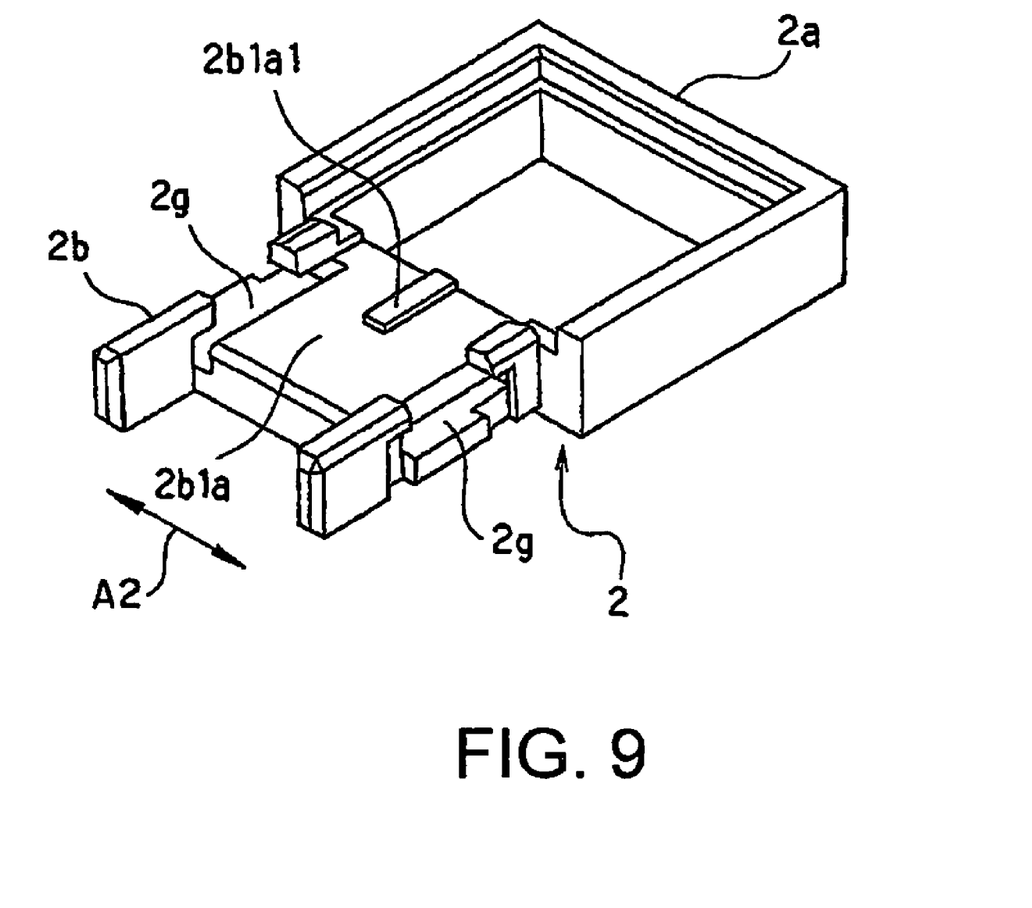
FIG. 9 is a perspective view, as seen from the back surface side, of a housing included in the optical connector shown in FIG. 7.

Referring to FIGS. 7 to 9, an optical connector according to a second exemplary embodiment of the invention will be described. The same reference symbols are assigned to like portions, thereby omitting description thereof.

As shown in FIG. 7, a groove-like concave portion 12c is formed on a surface of a base member 12 fixed to an optical medium 11. The depth of the concave portion 12c is smaller than the thickness of the base member 12.

On the other hand, as shown in FIGS. 8 and 9, in a positioning portion 2b1a of a housing 2, a convex portion 2b1a1 is formed as a second positioning portion at a position adjacent to a frame-like portion 2a. The convex portion 2b1a1 serves to guide the concave portion 12c. Herein, guide represents sliding in a predetermined direction and stopping at a predetermined position. When a connection object 10 is inserted into an optical connector 1, the convex portion 2b1a1 guides the concave portion 12c and thus the optical medium 11 is properly positioned with respect to an optical element 23 of an optical module 21.

Further, as shown in FIG. 9, a guide portion 2 is formed with cut-out portions 2g. Accordingly, it is configured that second pressing portions (3d, 3e) sandwich the connection object 10 therebetween in a second direction A2.

Then, in a state where the connection object 10 is sandwiched between the second pressing portions (3d, 3e), the connection object 10 is moved following the movement of a slider 3 so that the optical medium 11 is caused to abut the optical module 21. As a result, the optical medium 11 is optically connected to the optical module 21 securely.

Hereinbelow, various exemplary embodiments of the invention will be enumerated.

1. An optical connector for connecting a connection object 10 to an optical module 21, comprising a housing 2 for positioning the connection object 10 and the optical module 21 and a slider 3 slidably held by the housing 2, wherein the housing 2 includes a first positioning portion 2b1a for receiving the connection object 10, and wherein the slider 3 includes a first pressing portion (3a, 3b, 3c) for elastically pressing the connection object 10 in a first direction A1 toward the first positioning portion 2b1a and a second pressing portion that elastically acts in a second direction A2 perpendicular to the first direction A1.

2. An optical connector as described in item 1, wherein the housing 2 includes a first receiving portion 2a1 for receiving the optical module 21 and a second receiving portion 2b1 communicating with the first receiving portion 2a1 and adapted for receiving the connection object 10, and wherein, by inserting the connection object 10 into the second receiving portion 2b1, the connection object 10 is enabled to contact the optical module 21 introduced into the second receiving portion 2b1 through the first receiving portion 2a1.

3. An optical connector as described in item 2, wherein the first positioning portion 2b1a is provided in the second receiving portion 2b1.

4. An optical connector as described in item 2 or 3, wherein the slider 3 is disposed near the second receiving portion 2b1.

5. An optical connector as described in any of items 2 to 4, wherein the housing 2 includes a frame-like portion 2a defining the first receiving portion 2a1 and a guide portion 2b extending outward from a part of the frame-like portion 2a and defining the second receiving portion 2b1.

6. An optical connector as described in item 5, wherein the frame-like portion 2a includes a mounting portion 2e for receiving the optical module 21 received in the first receiving portion 2a1.

7. An optical connector as described in item 5 or 6, wherein the slider 3 is formed into a tubular shape and fitted around the guide portion 2b.

8. An optical connector as described in item 7, wherein the second pressing portion includes a pair of spring pieces 3d and 3e for elastically sandwiching the guide portion 2b therebetween in the second direction A2.

9. An optical connector as described in any of items 1 to 7, wherein the second pressing portion includes a pair of spring pieces 3d and 3e for elastically sandwiching the connection object 10 therebetween in the second direction A2.

10. An optical connector as described in any of items 1 to 9, wherein the first positioning portion 2b1 a has a flat surface 2c.

11. An optical connector as described in any of items 1 to 10, wherein the housing 2 includes a second positioning portion 2b1a1 for positioning the connection object 10 in the second direction A2.

12. An optical connector as described in any of items 1 to 11, further comprising a heat radiating plate 4 received in the housing 2 to face the optical module 21.

13. An optical connector as described in any of items 1 to 12, wherein the slider 3 has a function of maintaining a state where the connection object 10 is butted against the optical module 21.

Hereinbelow, various exemplary effects of the invention will be enumerated.

1. Since the connection object is securely positioned with respect to the housing by the use of the slider, the connection object is accurately aligned with the optical module.

2. When the connection object is inserted into the slider and then the slider is caused to slide, the connection object is connected to the optical module and, therefore, the operation is simple and easy.

While the present invention has been described with reference to the embodiments thereof, the present invention is not limited to the above embodiments. It will be understood by those of ordinary skill in the art that various changes in structure and details may be made without departing from the scope of the present invention.

This application claims the benefit of priority from Japanese patent application No. 2007-16249, filed on Jan. 26, 2007, the disclosure of which is incorporated herein in its entirety by reference.

The invention claimed is:

1. An optical connector for connecting a connection object to an optical module, comprising:
    a housing for positioning the connection object and the optical module; and
    a slider slidably held by the housing;
    wherein the housing comprises a first positioning portion for receiving the connection object;
    wherein the slider comprises:
        a first pressing portion for elastically pressing the connection object in a first direction toward the first positioning portion; and
        a second pressing portion that elastically presses the housing in a second direction perpendicular to the first direction;
    wherein the housing further comprises:
        a first receiving portion for receiving the optical module; and
        a second receiving portion adapted for receiving the connection object, the second receiving portion communicating with the first receiving portion in a third direction which is perpendicular to the first and second directions; and
    wherein, by inserting the connection object into the second receiving portion with the optical module being received in the first receiving portion, the connection object is contacted with the optical module in the third direction and optically connected to the optical module.

2. The optical connector according to claim 1, wherein the first positioning portion is provided in the second receiving portion.

3. The optical connector according to claim 1, wherein the slider is disposed near the second receiving portion.

4. The optical connector according to claim 1, wherein the housing comprises:
    a frame-like portion defining the first receiving portion; and
    a guide portion extending outward from a part of the frame-like portion and defining the second receiving portion.

5. The optical connector according to claim 4, wherein the frame-like portion comprises a mounting portion for receiving the optical module received in the first receiving portion.

6. The optical connector according to claim 4, wherein the slider is formed into a tubular shape and fitted around the guide portion.

7. The optical connector according to claim 6, wherein the second pressing portion comprises a pair of spring pieces for elastically sandwiching the guide portion therebetween in the second direction.

8. The optical connector according to claim 1, wherein the second pressing portion comprises a pair of spring pieces for elastically sandwiching the connection object therebetween in the second direction.

9. The optical connector according to claim 1, wherein the first positioning portion comprises a flat surface.

10. The optical connector according to claim 1, wherein the housing comprises a second positioning portion for positioning the connection object in the second direction.

11. The optical connector according to claim 1, further comprising a heat radiating plate received in the housing to face the optical module.

12. The optical connector according to claim 1, wherein the slider has a function of maintaining a state where the connection object is butted against the optical module.

* * * * *